United States Patent
Haneda et al.

(10) Patent No.: US 11,261,913 B2
(45) Date of Patent: Mar. 1, 2022

(54) SLIDING MEMBER

(71) Applicant: DAIDO METAL COMPANY LTD., Nagoya (JP)

(72) Inventors: Yuma Haneda, Inuyama (JP); Hiroki Kobayakawa, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 245 days.

(21) Appl. No.: 16/057,923

(22) Filed: Aug. 8, 2018

(65) Prior Publication Data

US 2019/0101156 A1  Apr. 4, 2019

(30) Foreign Application Priority Data

Sep. 29, 2017 (JP) .............................. JP2017-190112

(51) Int. Cl.
*F16C 33/20* (2006.01)
*F16C 33/12* (2006.01)
(Continued)

(52) U.S. Cl.
CPC ............ *F16C 33/124* (2013.01); *F16C 17/02* (2013.01); *F16C 17/022* (2013.01); *F16C 33/046* (2013.01); *F16C 33/1095* (2013.01); *F16C 33/201* (2013.01); *F16C 33/206* (2013.01); *F16C 33/208* (2013.01); *F16C 33/24* (2013.01); *F16C 33/6696* (2013.01); *F16C 2202/52* (2013.01); *F16C 2202/54* (2013.01); *F16C 2208/40* (2013.01); *F16C 2208/42* (2013.01); *F16C 2208/60* (2013.01); (Continued)

(58) Field of Classification Search
CPC .... F16C 33/124; F16C 33/046; F16C 33/206; F16C 33/1095; F16C 17/02; F16C 2360/22; F16C 2208/60; F16C 2208/40; F16C 2208/42; F16C 2208/90; F16C 2208/86; F16C 2202/54; F16C 2202/52; F16C 33/121; F16C 33/20
USPC ........................................................... 508/100
See application file for complete search history.

(56) References Cited

U.S. PATENT DOCUMENTS 5,990,222 A * 11/1999 Watada .................... C08K 3/01
524/492
2006/0083451 A1   4/2006 Kawagoe et al.
(Continued)

FOREIGN PATENT DOCUMENTS

DE   102009037262 A1   2/2011
JP   2004-211859 A     7/2004
(Continued)

OTHER PUBLICATIONS

Extended European Search Report issued in corresponding European Application No. 18188558.3 dated Mar. 19, 2019, 9 pages.

*Primary Examiner* — Prem G Singh
*Assistant Examiner* — Francis C Campanell
(74) *Attorney, Agent, or Firm* — Snyder, Clark, Lesch & Chung, LLP

(57) ABSTRACT

Disclosed herein is a sliding member, such as a sliding bearing, including a resin overlay layer having improved conformability. The sliding member includes a bearing alloy layer and a resin overlay layer formed on the bearing alloy layer, wherein the resin overlay layer includes a solid lubricant phase, a binder resin phase, and a cushion phase, and an area ratio of the cushion phase is 0.5% or more but 5.0% or less.

7 Claims, 3 Drawing Sheets

(51) Int. Cl.
   *F16C 33/10* (2006.01)
   *F16C 17/02* (2006.01)
   *F16C 33/66* (2006.01)
   *F16C 33/04* (2006.01)
   *F16C 33/24* (2006.01)

(52) U.S. Cl.
   CPC ...... *F16C 2208/86* (2013.01); *F16C 2208/90* (2013.01); *F16C 2360/22* (2013.01)

(56) References Cited

U.S. PATENT DOCUMENTS

| | | |
|---|---|---|
| 2012/0308168 A1 | 12/2012 | Watanabe et al. |
| 2013/0183488 A1* | 7/2013 | Liao .................... C09D 127/18 428/141 |
| 2015/0016766 A1* | 1/2015 | Asakura ................ C22C 12/00 384/625 |
| 2015/0330445 A1* | 11/2015 | Kamiya ............... F16C 33/201 384/297 |
| 2017/0233671 A1* | 8/2017 | Yamauchi ........... C10M 125/08 508/106 |
| 2018/0087574 A1 | 3/2018 | Yamauchi |
| 2019/0003529 A1 | 1/2019 | Motoda et al. |

FOREIGN PATENT DOCUMENTS

| | | |
|---|---|---|
| JP | 2011-179566 A | 9/2011 |
| WO | 2008088600 A1 | 7/2008 |
| WO | 2011018343 A1 | 2/2011 |
| WO | 2018038241 A1 | 3/2018 |

* cited by examiner

SLIDING MEMBER

BACKGROUND

1. Technical Field

The present invention relates to a sliding member. More specifically, the present invention relates to improvement of a sliding member having a resin overlay layer.

2. Related Art

As a sliding member, one having a resin surface to be in contact with a member to be slid is known. Such a resin overlay layer contains a solid lubricant to achieve low friction against a member to be slid.

The resin overlay layer is less likely to plastically deform than a metal overlay layer, and is therefore allowed to have an uneven surface (projections and recesses) so that the plastic deformation of the projections is promoted to improve conformability to a member to be slid (see JP 2004-211859 A and JP 2011-179566 A). Improved conformability reduces local contact even when misalignment occurs during assembly of a member to be slid and a sliding member, and therefore mechanical properties such as seizing resistance are not adversely affected.

SUMMARY

In the sliding bearing (sliding member) disclosed in JP 2004-211859 A or JP 2011-179566 A, the uneven surface of the resin overlay layer contributes to plastic deformation to improve the conformability of the sliding bearing to the shaft of a car engine (member to be slid).

As for recent car engines, a specific load between a shaft and a sliding bearing is higher, and an oil to be used is required to have a lower viscosity. Therefore, a sliding member is required to withstand use in severer conditions.

That is, the resin overlay layer of a sliding member is required to have improved conformability.

Under the above circumstances, the present inventors have intensively studied to improve the conformability of a resin overlay layer. As a result, the present inventors have paid attention to voids formed in the resin overlay layer to complete the present invention.

A first aspect of the present invention is defined as follows. A sliding member including: a bearing alloy layer; and a resin overlay layer formed on the bearing alloy layer, wherein the resin overlay layer includes: a solid lubricant phase; a binder resin phase; and a cushion phase, and wherein an area ratio of the cushion phase is 0.5% or more but 5.0% or less.

Here, voids inevitably formed in the resin overlay layer correspond to the cushion phase. The voids can store air, other gases, oil, and other liquids. By positively and purposefully providing such a cushion phase in the resin overlay layer, stress applied to the resin overlay layer is absorbed by the cushion phase. That is, the binder resin phase deforms so as to crush the cushion phase. This deformation is mainly elastic deformation. This improves conformability to a member to be slid.

When the cushion phase is excessively present in the resin overlay layer, the elastic deformability of the resin overlay layer is achieved, but there is a fear that abrasion resistance reduces or the coefficient of friction increases. Further, there is also a fear that adhesion to an underlayer is unstable. On the other hand, when the cushion phase is insufficiently present in the resin overlay layer, the resin overlay layer is less likely to elastically deform, which is not preferred.

The present inventors have determined an appropriate ratio of the cushion phase present in the resin overlay layer that is represented by an index defined as an "area ratio". Here, the area ratio of the cushion phase refers to the area ratio of voids appearing in a cut surface obtained by vertically cutting the resin overlay layer from its surface. The voids spread three-dimensionally, but their ratio is represented by the above-described two-dimensional index called "area ratio".

That is, when the area ratio of the cushion phase in the resin overlay layer is in the range of 0.5 to 5.0%, conformability improves, and therefore even when a member to be slid comes in partial contact with a sliding member, seizing is less likely to occur between them. When the area ratio is less than 0.5%, it is difficult to achieve sufficient conformability. When the area ratio exceeds 5.0%, rigidity reduces or adhesion to an underlayer reduces, which is not preferred.

It is to be noted that the area ratio of the cushion phase is more preferably 2.0 to 5.0%.

Here, the average of sizes of voids corresponding to the cushion phase (hereinafter also referred to as the "average size of the cushion phase") is preferably 0.004 $\mu m^2$ or more but 0.020 $\mu m^2$ or less. Further, the sizes of voids corresponding to the cushion phase (hereinafter also referred to as the "size of the cushion phase") are preferably as uniform as possible, and the average-3σ (standard deviation) is preferably 0.003 $\mu m^2$ or more, and the average+3σ (standard deviation) is preferably 0.050 $\mu m^2$ or less. By setting the average size of the cushion phase to a value within the above range and by setting the average-3σ and the average+3σ to values within the above ranges to make the size of the cushion phase uniform, sufficient elastic deformability as well as plastic deformability can be imparted to the entire region of the resin overlay layer.

On the other hand, when the average size of the cushion phase is less than 0.004 $\mu m^2$, there is a fear that the effect obtained by the plastic deformation amount of the resin overlay layer is reduced. On the other hand, when the average size of the cushion phase is as large as more than 0.020 $\mu m^2$, there is a fear that dispersibility of the cushion phase in the resin overlay layer is reduced so that sufficient elastic deformability cannot be achieved over the entire region of the resin overlay layer. It is to be noted that the reason why the distribution range of size of the cushion phase is set to the above-described range is to achieve uniform and sufficient elastic deformability over the entire region of the resin overlay layer.

The area ratio and size of the cushion phase may vary depending on a material constituting the resin overlay layer, an apparatus for producing the resin overlay layer, and conditions for producing the resin overlay layer. According to a study by the present inventors, the area ratio and size of the cushion phase could be adjusted by adjusting conditions for drying the resin overlay layer or by adjusting the ratio of a solvent.

A second aspect of the present invention is defined as follows. In the sliding member according to the first aspect, a ratio of the solid lubricant phase in the resin overlay layer is 20 vol % or more but 70 vol % or less.

By setting the ratio of volume of the solid lubricant phase to the total volume of the resin overlay layer to 20 to 70 vol %, the conformability of the resin overlay layer having a cushion phase is further improved. When the ratio of the solid lubricant phase is less than 20 vol %, there is a fear that lubricity reduces. When the ratio of the solid lubricant phase exceeds 70 vol %, there is a fear that the resin overlay layer is brittle due to the lack of a binder resin component.

The above-described volume ratio can, of course, be determined by comparing the volumes of raw materials of the components, and can be determined also by ICP chemical analysis of the resin overlay layer of the sliding member.

A third aspect of the present invention is defined as follows. The sliding member according to the first aspect or the second aspect further includes an intermediate buffer layer provided between the bearing alloy layer and the resin overlay layer, the intermediate buffer layer being made of a softer metal than the bearing alloy layer and having a thickness of 0.2 times or more but 6.0 times or less a thickness of the resin overlay layer.

Providing the intermediate buffer layer between the resin overlay layer and the bearing alloy layer improves the conformability of the sliding member.

The present inventors have searched an intermediate buffer layer suitable for use with the resin overlay layer having a cushion phase. As a result, the present inventors have found that the thicknesses of both the layers relate to conformability. More specifically, when the thickness of the intermediate buffer layer is 0.2 to 6.0 times the thickness of the resin overlay layer having a predetermined amount of a cushion phase, conformability significantly improves. When the ratio between the thicknesses of both the layers is less than 0.2 or exceeds 6.0, the performance of the sliding member improves only slightly or hardly at all as compared with that of the sliding member having no intermediate buffer layer.

BRIEF DESCRIPTION OF DRAWINGS

FIGS. 2A to 2C are microscope photographs for explaining a method for calculating the ratio of a cushion phase in a resin overlay layer of the sliding bearing according to the embodiment of the present invention, wherein FIG. 2A is a microscope photograph of a cut surface obtained by vertically cutting the resin overlay layer from its bearing surface, FIG. 2B is a microscope photograph obtained by reversing the color of FIG. 2A, and FIG. 2C is a microscope photograph showing the result of image processing of FIG. 2B.

DETAILED DESCRIPTION

Hereinafter, the present invention will be described based on embodiments.

Figure 1:
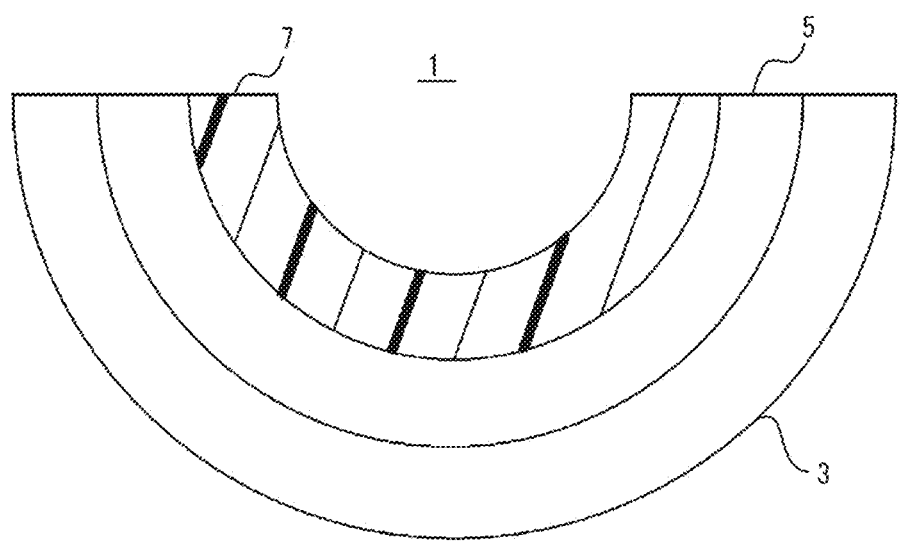
FIG. 1 is a cross-sectional view of a sliding bearing according to a first embodiment of the present invention.

FIG. 1 shows the layer structure of a sliding bearing 1 as a sliding member according to a first embodiment of the present invention.

The sliding bearing 1 includes a back metal layer 3, a bearing alloy layer 5, and a resin overlay layer 7.

The back metal layer 3 is formed of a steel plate formed into a cylindrical or a semi-cylindrical shape. On the upper surface of the back metal layer 3, the bearing alloy layer 5 made of an alloy of Al, Cu, Sn, or the like is laminated by a method such as sintering, casting, or pressure welding.

In order to improve adhesion between the bearing alloy layer 5 and the resin overlay layer 7, the inner peripheral surface of the bearing alloy layer 5 may be subjected to surface roughening. The surface roughening may be performed by chemical surface treatment such as combination of alkaline etching and pickling, or mechanical surface treatment such as shot blasting.

A composition constituting the resin overlay layer 7 contains a binder resin and a solid lubricant.

Here, the binder resin can be appropriately selected depending on the intended use of the sliding bearing 1. For example, the binder resin may be at least one of polyimide resins, polyamideimide resins, epoxy resins, phenol resins, polyamide resins, fluorine resins, and elastomers, and may be a polymer alloy.

The material of the solid lubricant may also be appropriately selected depending on the intended use of the sliding bearing. For example, the solid lubricant may be at least one selected from molybdenum disulfide, tungsten disulfide, h-BN (h-boron nitride), PTFE (polytetrafluoroethylene), graphite, melamine cyanurate, carbon fluoride, phthalocyanine, graphene nanoplatelets, fullerene, ultrahigh molecular weight polyethylene (manufactured by Mitsui Chemicals, Inc. under the trade name of "MIPELON"), and NE-lauroyl-L-lysine (manufactured by Ajinomoto Co., Inc. under the trade name of "AMIHOPE").

The composition constituting the resin overlay layer 7 may contain any auxiliary agent in addition to the binder resin and the solid lubricant described above. Examples of the auxiliary agent include metal particles, metal oxide particles, and metal nitride particles.

The thickness of the resin overlay layer 7 is adjusted depending on the intended use of the sliding bearing, and is, for example, 2 to 20 μm.

The resin overlay layer 7 is formed in the following manner.

A resin material to be used as a binder resin is dissolved using a specific solvent such as NMP (N-methyl-2-pyrrolidone), isophorone, GBL (γ-butyl lactone), DMSO (dimethylsulfoxide), or DAM (dimethylacetamide). Such a solvent generally has a higher boiling point (boiling point: higher than 150° C.) and is expensive. This solvent also needs to disperse a solid lubricant therein. Therefore, a binder resin is dissolved in a first solvent such as NMP, and then a second solvent is added thereto to adjust the viscosity thereof to facilitate the dispersion of a solid lubricant. The second solvent may be a solvent having a lower boiling point (boiling point: 150° C. or lower) than the first solvent, and examples of such a solvent include ethanol, butyl acetate, cyclohexane, methyl ethyl ketone, MIBK (methyl isobutyl ketone), toluene, xylene, and ethyl benzene.

The ratio of the mass of the second solvent to the total mass of the solvents is preferably 15 mass % or more but 40 mass % or less. More preferably, the ratio of the mass of the second solvent to the total mass of the solvents is 40 mass % or less. By setting the mass % of the second solvent to a value within the above-described range, the area ratio and size of the cushion phase of the resin overlay layer 7 can be easily adjusted to be within their respective desired ranges.

The thus obtained liquid composition is applied onto the surface of the bearing alloy layer 5, dried to volatilize the solvents, and then thermally cured. The liquid composition may be applied by a known method such as spray coating, roll coating, padding, or screen coating.

The drying is performed at 80 to 160° C. It is to be noted that when the ratio of the mass of the second solvent to the total mass of the solvents is within the above-described range of 15 mass % or more but 40 mass % or less, the area ratio and size of the cushion phase of the resin overlay layer 7 can be more easily adjusted to be within their respective desired ranges by completing the drying within 3 minutes just after the liquid composition is applied. The determination as to whether or not the drying is completed is made by visual observation.

Figure 2A:
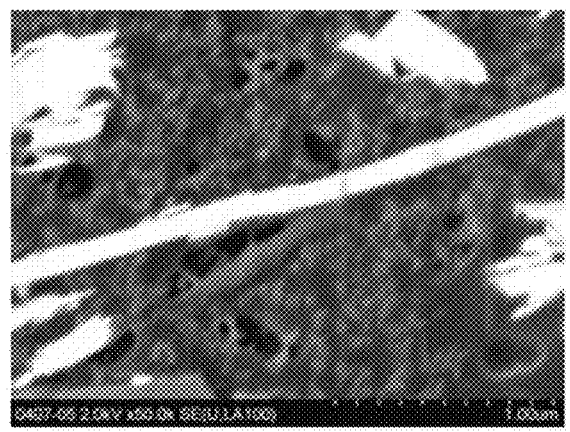

The thus formed resin overlay layer 7 of the sliding bearing 1 was vertically cut from its surface along an axial direction, and the cut surface was subjected to fine polishing and observed with a scanning electron microscope. The thus obtained image is shown in FIG. 2A. The color of the image of FIG. 2A was reversed to obtain an image shown in FIG. 2B. FIG. 2C shows an image obtained by binarizing the image of FIG. 2B. In FIG. 2C, white areas represent voids corresponding to the cushion phase 11.

Figure 2B:
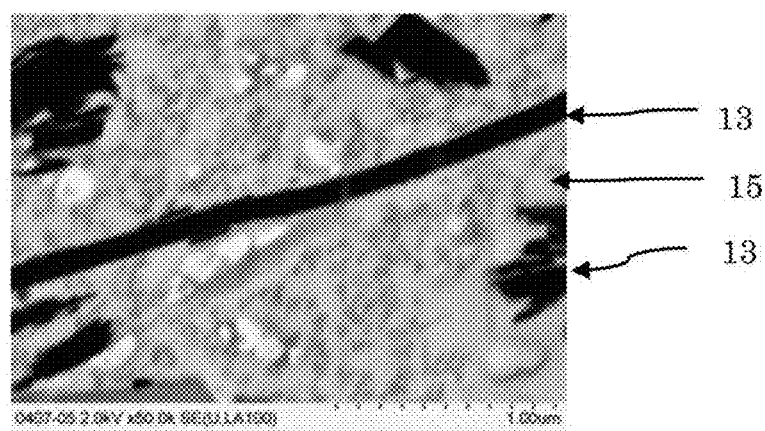
Figure 2C:
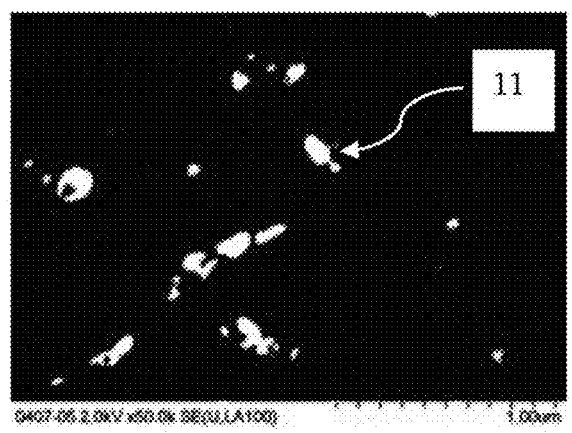

In FIG. 2B, reference numeral 13 denotes a solid lubricant phase, and reference numeral 15 denotes a binder resin phase.

Here, the area ratio of the cushion phase 11 was determined in the following manner.

When the image of the cut surface is taken with an electron microscope, the observation range of the electron microscope is a rectangle with a size of 1.7 µm in length and 2.5 µm in width. The obtained image was processed to obtain an image shown in FIG. 2C, and this image was processed with a general-purpose image analyzer to determine the area ratio and size dispersion of white areas corresponding to the cushion phase 11.

As described above, the area ratio of the cushion phase 11 at the time when the area of the observation range is taken as 100% is preferably 0.5 to 5.0%. Further, the average size of the cushion phase 11 is preferably 0.004 $\mu m^2$ or more but 0.020 $\mu m^2$ or less. Further, the size of the cushion phase 11 is preferably as uniform as possible, and the average-3σ is preferably 0.003 $\mu m^2$ or more, and the average+3σ is preferably 0.050 $\mu m^2$ or less.

In order to evaluate the conformability of the sliding bearing having the thus obtained resin overlay layer 7, a seizing test was performed under conditions where the sliding bearing was forcibly tilted with respect to a shaft so that the sliding bearing and the shaft were in partial contact with each other. As a result, the sliding bearing according to this embodiment delivered excellent seizing resistance.

The present inventors have studied a preferred mixing ratio of components of the composition constituting the resin overlay layer 7 having the cushion phase 11. As a result, the ratio of the volume of the solid lubricant phase is set to 20 to 70 vol % per 100 vol % of the total volume of the resin overlay layer.

The sliding bearing was formed in such a manner that the volume ratio of the solid lubricant phase of the resin overlay layer was 20 to 70 vol %, and subjected to a seizing test. As a result, the seizing resistance of the sliding bearing was further improved.

Figure 3:
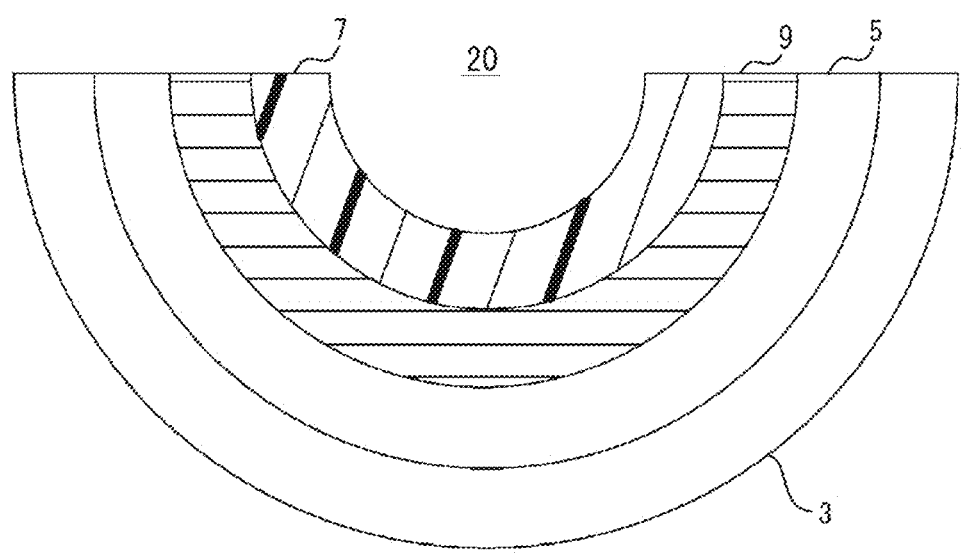
FIG. 3 is a cross-sectional view of a sliding bearing according to a second embodiment of the present invention.

FIG. 3 shows a sliding bearing 20 according to a second embodiment of the present invention. The same elements as those shown in FIG. 1 are denoted by the same reference numerals, and a description thereof will be partially omitted.

In this sliding bearing 20, an intermediate buffer layer 9 is formed between the bearing alloy layer 5 and the resin overlay layer 7. The intermediate buffer layer 9 is made of a softer metal than the bearing alloy layer 5. Examples of the metal that can be used for the intermediate buffer layer 9 include elemental Pb, Sn, In, Cu, Bi, and Sb and alloys thereof.

The intermediate buffer layer 9 is laminated on the surface of the bearing alloy layer 5 by a method such as PVD, CVD, thermal spraying, or plating.

The material and thickness of the intermediate buffer layer 9 can be appropriately selected depending on the intended use of the sliding bearing.

The present inventors have studied the intermediate buffer layer 9 suitable for use with the resin overlay layer 7 having the cushion phase 11. As a result, the thickness of the intermediate buffer layer 9 is set to 0.2 to 6.0 times the thickness of the resin overlay layer 7. The sliding bearing was formed in such a manner that the thickness of the intermediate buffer layer 9 and the thickness of the resin overlay layer 7 had such a relationship, and subjected to a seizing test. As a result, the seizing resistance of the sliding bearing was further improved.

EXPERIMENTAL EXAMPLES

Hereinbelow, experimental examples will be described.

Sliding bearings of Examples and Comparative Examples are formed in the following manner.

A so-called bimetal was produced by lining a steel back metal layer 3 with a Cu-based bearing alloy layer 5. The bimetal was formed into a semi-cylindrical shape, and the surface of the bearing alloy layer 5 was subjected to boring processing for surface finishing.

Then, the bearing alloy layer 5 was subjected to surface roughening by shot blasting as pretreatment for forming a resin overlay layer 7 to achieve adhesion between the resin overlay layer 7 and the bearing alloy layer 5.

At the same time, a binder resin (e.g., PAI (polyamide-imide)) was dissolved in a first solvent (NMP) to obtain a solution, and then a predetermined amount of $MoS_2$ as a solid lubricant was dispersed in the solution. Then, the solution was diluted with a second solvent (e.g., xylene) having a low boiling point (the ratio of total mass of the solvents to the mass of the liquid composition: 75 mass %). The ratio of total mass of the solvents to the mass of the liquid composition is preferably 65 to 85 mass %. At this time, the area ratio of a cushion phase 11 was adjusted by adjusting the ratio of mass of the second solvent to the total mass of the solvents (first solvent+second solvent). When the mass ratio of the second solvent is less than 15 mass %, there is a high possibility that the size of the cushion phase 11 is relatively small and the area ratio of the cushion phase 11 is less than 0.5%. On the other hand, when the mass ratio of the second solvent exceeds 40 mass %, there is a high possibility that the size of the cushion phase 11 is relatively large, and the area ratio of the cushion phase 11 exceeds 5.0%.

The thus obtained liquid composition was uniformly applied on the surface of the bearing alloy layer 5 by air spraying. The application thickness of the liquid composition was 3 to 20 µm. Then, the applied liquid composition was immediately dried. At this time, the heating temperature was adjusted to be within a range of 80 to 160° C. so that the drying was completed in 3 minutes.

Then, the binder resin was cured by heating at 160 to 240° C. for about 60 minutes.

The application thickness of the liquid composition hardly changes even after the heat treatment (drying and curing). That is, the thickness of the resin overlay layer is substantially the same as the application thickness of the liquid composition. In the present invention, the thickness of a layer formed on the bearing alloy layer in the sliding member is defined as a total thickness. That is, for example, when the resin overlay layer is formed on the bearing alloy layer with an intermediate buffer layer being interposed therebetween, the total thickness refers to the total average thickness of the intermediate buffer layer and the resin overlay layer, and when only the resin overlay layer is formed, the total thickness refers to the average thickness of the resin overlay layer.

In this way, sliding bearings of Examples were obtained whose inner diameter was 45 mm and axial direction length was 30 mm.

In order to evaluate the conformability of the sliding bearings of Examples, a seizing test was performed.

The sliding bearing of Example was mounted in a housing in such a manner that a shim was placed between the housing and the back surface of the sliding bearing in order to intentionally tilt the axial center of a shaft supported by the sliding bearing with respect to the axial center of the sliding bearing.

The shaft was rotated at a circumferential speed of 25 m/s, and a specific load between the shaft and the sliding bearing was increased by increments of 5 MPa every 10 minutes. The maximum specific load at which seizing did not occur between the shaft and the sliding bearing was determined as the result of the seizing test.

The properties of sliding bearings of Examples 1 to 7 and Comparative Examples 1 and 2 are shown in Table 1.

In each of Examples and Comparative Examples, the area ratio of the cushion phase was adjusted in the following manner. In Example 1 (area ratio: 5.0%), the mass ratio of the second solvent was set to 40 mass %, in Example 2 (area ratio: 2.2%), the mass ratio of the second solvent was set to 25 mass %, in Example 3 (area ratio: 0.5%), the mass ratio of the second solvent was set to 15 mass %, in Comparative Example 1 (area ratio: 6.2%), the mass ratio of the second solvent was set to 50 mass %, and in Comparative Example 2 (area ratio: 0.3%), the mass ratio of the second solvent was set to 5 mass %.

As can be seen from the results of Examples 1 to 3 shown in Table 1, when the area ratio of the cushion phase is in a range of 0.5 to 5.0%, the specific load for seizing is 50 MPa or more. From the experience of the present inventors, it is considered that the sliding bearings whose specific load for seizing is 50 MPa or more have sufficient conformability.

On the other hand, when the area ratio of the cushion phase exceeded 5.0%, as shown in Comparative Example 1, adhesion of the resin overlay layer to the bearing alloy layer was insufficient, and therefore the specific load for seizing was unmeasurable. When the area ratio of the cushion phase is less than 0.5%, as shown in Comparative Example 2, the specific load for seizing is 20 MPa, that is, the sliding bearing is poor in conformability.

It is to be noted that the thickness of the resin overlay layer of Example 4 is about half that of Example 2. The thickness of the resin overlay layer of Example 5 is 4 times that of Example 2. The results (specific load for seizing) of Examples 4 and 5 reveal that the thickness of the resin overlay layer, that is, the total thickness can be freely selected. Particularly, the total thickness is preferably 3 to 20 μm.

In Example 6, an Al-based material, that is, an Al alloy was selected as a material of the bearing alloy layer. As can be seen from the comparison between the result of Example 6 and the results of Examples 1 to 5, especially the result of Example 2, the material of the bearing alloy layer can be freely selected.

In Example 7, PI was selected as the binder resin. As can be seen from the comparison between the result of Example 7 and the results of Examples 1 to 5, especially the result of Example 2, the binder resin constituting the resin overlay layer can be freely selected.

Example 2 and Examples 8 to 12 are shown in Table 2.

TABLE 1

| | Thickness of | | Type of | Solid lubricant | | | Intermediate buffer layer | | Area ratio of | Specific load |
| | Total thickness (μm) | resin overlay layer (μm) | binder resin | Type | Amount (vol %) | Type of bearing alloy layer | Type | Intermediate buffer layer thickness/resin overlay layer thickness | cushion phase (%) | for seizing (MPa) |
|---|---|---|---|---|---|---|---|---|---|---|
| Example 1 | 5 | 5 | PAI | MoS$_2$ | 10.5 | Cu-based | — | — | 5.0 | 60 |
| Example 2 | 5 | 5 | PAI | MoS$_2$ | 9.5 | Cu-based | — | — | 2.2 | 55 |
| Example 3 | 5 | 5 | PAI | MoS$_2$ | 10.0 | Cu-based | — | — | 0.5 | 50 |
| Example 4 | 3 | 3 | PAI | MoS$_2$ | 9.5 | Cu-based | — | — | 2.4 | 55 |
| Example 5 | 20 | 20 | PAI | MoS$_2$ | 9.5 | Cu-based | — | — | 2.5 | 55 |
| Example 6 | 5 | 5 | PAI | MoS$_2$ | 9.5 | Al-based | — | — | 2.1 | 55 |
| Example 7 | 5 | 5 | PI | MoS$_2$ | 9.5 | Cu-based | — | — | 1.5 | 55 |
| Comparative Example 1 | 5 | 5 | PAI | MoS$_2$ | 10.7 | Cu-based | — | — | 6.2 | NO |
| Comparative Example 2 | 5 | 5 | PAI | MoS$_2$ | 10.0 | Cu-based | — | — | 0.3 | 20 |

TABLE 2

| | Thickness of | | Type of | Solid lubricant | | Type of | Intermediate buffer layer | | | |
| | Total thickness (μm) | resin overlay layer (μm) | binder resin | Type | Amount (vol %) | bearing alloy layer | Type | Intermediate buffer layer thickness/resin overlay layer thickness | Area ratio of cushion phase (%) | Specific load for seizing (MPa) |
|---|---|---|---|---|---|---|---|---|---|---|
| Example 2 | 5 | 5 | PAI | MoS₂ | 9.5 | Cu-based | — | — | 2.2 | 55 |
| Example 8 | 5 | 5 | PAI | MoS₂ | 75.0 | Cu-based | — | — | 1.8 | 55 |
| Example 9 | 5 | 5 | PAI | MoS₂ | 70.0 | Cu-based | — | — | 2.8 | 75 |
| Example 10 | 5 | 5 | PAI | MoS₂ | 45.0 | Cu-based | — | — | 3.0 | 70 |
| Example 11 | 5 | 5 | PAI | MoS₂ | 20.0 | Cu-based | — | — | 3.2 | 65 |
| Example 12 | 5 | 5 | PAI | Graphite | 45.0 | Cu-based | — | — | 3.0 | 70 |

As can be seen from the results of Examples 9 to 11, the volume ratio of the solid lubricant phase is preferably 20 vol % or more but 70 vol % or less. That is, as can be seen from the comparison between the result (specific load for seizing) of Example 2 in which the volume ratio of the solid lubricant phase is less than 20 vol % and the result of Example 8 in which the volume ratio of the lubricant phase exceeds 70 vol % and the results of Examples 9 to Examples 11, the values of specific load for seizing of the latter are obviously higher.

In Example 12, graphite was selected as the solid lubricant. As can be seen from the comparison between the result of Example 12 and the result of Example 10, the solid lubricant constituting the resin overlay layer can be freely selected.

Example 2 and Examples 13 to 20 are shown in Table 3.

In Examples 13 to 20, an intermediate buffer layer was formed by electroplating.

In Example 19, the total thickness (thickness of the resin overlay layer+thickness of the intermediate buffer layer) was half those of Examples 13 to 18. The result of Example 19 (specific load for seizing) is not much different from the results of Examples 13 to 18, especially the result of Example 14. This reveals that the total thickness can be freely selected even when the intermediate buffer layer is provided. It is to be noted that when the intermediate buffer layer is provided, the total thickness is preferably 10 to 20 μm.

In Example 20, the highest specific load for seizing was achieved.

The present invention is not limited to the above description of the embodiments according to the present invention. Various modified embodiments are also included in the present invention as long as they are easily conceivable by those skilled in the art and do not depart from the scope of

TABLE 3

| | Thickness of | | Type of | Solid lubricant | | Type of | Intermediate buffer layer | | | |
| | Total thickness (μm) | resin overlay layer (μm) | binder resin | Type | Amount (vol %) | bearing alloy layer | Type | Intermediate buffer layer thickness/resin overlay layer thickness | Area ratio of cushion phase (%) | Specific load for seizing (MPa) |
|---|---|---|---|---|---|---|---|---|---|---|
| Example 2 | 5 | 5.0 | PAI | MoS₂ | 9.5 | Cu-based | — | — | 2.2 | 55 |
| Example 13 | 20 | 2.9 | PAI | MoS₂ | 13.0 | Cu-based | Bi-based | 6.0 | 1.6 | 75 |
| Example 14 | 20 | 5.7 | PAI | MoS₂ | 10.5 | Cu-based | Bi-based | 2.5 | 1.8 | 70 |
| Example 15 | 20 | 16.7 | PAI | MoS₂ | 10.5 | Cu-based | Bi-based | 0.2 | 1.5 | 65 |
| Example 16 | 20 | 2.5 | PAI | MoS₂ | 14.0 | Cu-based | Bi-based | 7.0 | 1.8 | 55 |
| Example 17 | 20 | 18.2 | PAI | MoS₂ | 11.0 | Cu-based | Bi-based | 0.1 | 1.8 | 55 |
| Example 18 | 20 | 5.7 | PAI | MoS₂ | 10.5 | Cu-based | Pb-based | 2.5 | 2.0 | 70 |
| Example 19 | 10 | 2.9 | PAI | MoS₂ | 10.5 | Cu-based | Bi-based | 2.5 | 1.8 | 70 |
| Example 20 | 20 | 5.0 | PAI | MoS₂ | 55.0 | Cu-based | Bi-based | 3.0 | 1.5 | 80 |

As can be seen from the results of Examples 13 to 15, the thickness of the intermediate buffer layer is preferably 0.2 times or more but 6.0 times or less the thickness of the resin overlay layer. That is, as can be seen from the comparison between the result (specific load for seizing) of Example 16 in which the thickness of the intermediate buffer layer is more than 6.0 times the thickness of the resin overlay layer and the result (specific load for seizing) of Example 17 in which the thickness of the intermediate buffer layer is less than 0.2 times the thickness of the resin overlay layer and the results of Examples 13 to 15, the values of specific load for seizing of the latter are obviously higher.

In Example 18, a Pb-based material (Pb alloy) was selected as a material of the intermediate buffer layer. As can be seen from the comparison between the result (specific load for seizing) of Example 18 and the results of previous Examples, especially the result of Example 14, the material of the intermediate buffer layer can be freely selected.

the claims. Bearing-using apparatuses such as internal combustion engines using the sliding member according to the present invention exhibit excellent sliding properties.

The above embodiments have been described with reference to a case where the sliding member is a semi-cylindrical sliding bearing, but the present invention is applicable also to other sliding members such as flat plate-shaped thrust washers.

What is claimed is:

1. A sliding member comprising:
a bearing alloy layer; and
a resin overlay layer formed on the bearing alloy layer,
wherein the resin overlay layer comprises:
a solid lubricant phase,
a binder resin phase, and
a cushion phase including voids disposed in the binder resin phase and outside of the solid lubricant phase, wherein an area ratio of the cushion phase in the resin overlay layer is 0.5% or more and 5.0% or less,
the area ratio of the cushion phase in the resin overlay layer is a ratio of a cross-sectional areas of the voids to a cross-sectional area of the resin overlay layer,
the cross-sectional areas of the voids and the cross-sectional area of the resin overlay layer are obtained by cutting the resin overlay layer vertically from a surface of the resin overlay layer,
wherein an average of the cross-sectional areas of the voids is 0.0004 μm² or more, and 0.020 μm² or less, and
wherein σ is a standard deviation of the cross-sectional areas of the voids, the average plus 3σ is equal to 0.003 μm² or more, and the average minus 3σ is equal to 0.05 μm² or less.

2. The sliding member according to claim 1, wherein a ratio of the solid lubricant phase in the resin overlay layer is 20 vol % or more and 70 vol % or less.

3. The sliding member according to claim 1, further comprising an intermediate buffer layer provided between the bearing alloy layer and the resin overlay layer, the intermediate buffer layer being made of a softer metal than the bearing alloy layer and having a thickness of 0.2 times or more and 6.0 times or less a thickness of the resin overlay layer.

4. A sliding member comprising:
a bearing alloy layer; and
a resin overlay layer formed on the bearing alloy layer,
wherein the resin overlay layer includes:
    a solid lubricant phase,
    a binder resin phase, and
    a cushion phase comprising voids in the resin overlay layer, the cushion phase contacting the binder resin phase and locating outside of the solid lubricant phase, and
wherein an area ratio of the cushion phase in the resin overlay layer is between 0.5% and 5.0%,
the area ratio of the cushion phase in the resin overlay layer is a ratio of a cross-sectional areas of the voids to a cross-sectional area of the resin overlay layer,
the cross-sectional areas of the voids and the cross-sectional area of the resin overlay layer are obtained by cutting the resin overlay layer vertically from a surface of the resin overlay layer,
wherein an average of the cross-sectional areas of the voids is between 0.0004 μm² and 0.020 μm² and
wherein σ is a standard deviation of the cross-sectional areas of the voids, the average plus 3σ is equal to 0.003 μm² or more, and the average minus 3σ is equal to 0.05 μm² or less.

5. The sliding member according to claim 4, wherein a ratio of the solid lubricant phase in the resin overlay layer is between 20% volume and 70% volume.

6. The sliding member according to claim 4, further comprising an intermediate buffer layer provided between the bearing alloy layer and the resin overlay layer, the intermediate buffer layer being made of a metal softer than the bearing alloy layer and having a thickness of 0.2 times or more and 6.0 times or less a thickness of the resin overlay layer.

7. A sliding member comprising:
a bearing alloy layer; and
a resin overlay layer formed on the bearing alloy layer,
wherein the resin overlay layer comprises:
    a solid lubricant phase,
    a binder resin phase, and
    voids, which are a cushion phase, surrounded by the binder resin phase and disposed outside of the solid lubricant phase,
wherein an area ratio of the cushion phase in the resin overlay layer is 0.5% or more and 5.0% or less,
the area ratio of the cushion phase in the resin overlay layer is a ratio of a cross-sectional areas of the voids to a cross-sectional area of the resin overlay layer,
the cross-sectional areas of the voids and the cross-sectional area of the resin overlay layer are obtained by cutting the resin overlay layer vertically from a surface of the resin overlay layer,
wherein an average of the cross-sectional areas of the voids is 0.0004 μm² or more, and 0.020 μm² or less, and
wherein σ is a standard deviation of the cross-sectional areas of the voids, the average plus 3σ is equal to 0.003 μm² or more, and the average minus 3σ is equal to 0.05 μm² or less.

* * * * *

UNITED STATES PATENT AND TRADEMARK OFFICE
CERTIFICATE OF CORRECTION

PATENT NO. : 11,261,913 B2
APPLICATION NO. : 16/057923
DATED : March 1, 2022
INVENTOR(S) : Yuma Haneda et al.

It is certified that error appears in the above-identified patent and that said Letters Patent is hereby corrected as shown below:

In the Claims

In Claim 1, at Column 11, Lines 11-14, replace "wherein σ is a standard deviation of the cross-sectional areas of the voids, the average plus 3σ is equal to 0.003 µm² or more, and the average minus 3σ is equal to 0.05 µm² or less" with --wherein σ is a standard deviation of the cross-sectional areas of the voids, the average minus 3σ is equal to 0.003 µm² or more, and the average plus 3σ is equal to 0.05 µm² or less--

In Claim 4, at Column 12, Lines 3-6, replace "wherein σ is a standard deviation of the cross-sectional areas of the voids, the average plus 3σ is equal to 0.003 µm² or more, and the average minus 3σ is equal to 0.05 µm² or less" with --wherein σ is a standard deviation of the cross-sectional areas of the voids, the average minus 3σ is equal to 0.003 µm² or more, and the average plus 3σ is equal to 0.05 µm² or less--

In Claim 7, at Column 12, Lines 38-41, replace "wherein σ is a standard deviation of the cross-sectional areas of the voids, the average plus 3σ is equal to 0.003 µm² or more, and the average minus 3σ is equal to 0.05 µm² or less" with --wherein σ is a standard deviation of the cross-sectional areas of the voids, the average minus 3σ is equal to 0.003 µm² or more, and the average plus 3σ is equal to 0.05 µm² or less--

Signed and Sealed this
Tenth Day of May, 2022

Katherine Kelly Vidal
*Director of the United States Patent and Trademark Office*